C. W. SPICER.
FLEXIBLE COUPLING.
APPLICATION FILED JAN. 5, 1921.

1,438,273.

Patented Dec. 12, 1922.
2 SHEETS—SHEET 1.

Inventor
Clarence W. Spicer
By his Attorneys
Sheffield & Betts

C. W. SPICER.
FLEXIBLE COUPLING.
APPLICATION FILED JAN. 5, 1921.

1,438,273.

Patented Dec. 12, 1922.
2 SHEETS—SHEET 2.

Inventor
Clarence W. Spicer
By his Attorneys
Sheffield & Betts.

Patented Dec. 12, 1922.

1,438,273

UNITED STATES PATENT OFFICE.

CLARENCE W. SPICER, OF PLAINFIELD, NEW JERSEY, ASSIGNOR TO SPICER MFG. CORPORATION, OF SOUTH PLAINFIELD, NEW JERSEY, A CORPORATION OF VIRGINIA.

FLEXIBLE COUPLING.

Application filed January 5, 1921. Serial No. 435,172.

*To all whom it may concern:*

Be it known that I, CLARENCE W. SPICER, a citizen of the United States, residing at Plainfield, in the county of Union, State of New Jersey, have invented certain new and useful Improvements in Flexible Couplings, of which the following is a disclosure.

My invention relates to flexible couplings such as are commonly employed to connect shafts of all kinds, and the object of my invention is to provide a strong, durable coupling which may be used to connect two shafts which run out of line and which will also operate to take up shocks and vibrations and prevent them from being transmitted from one shaft or rotatable member to the other. My improved coupling, therefore, is flexible in two ways. First, it is flexible so as to allow the shafts connected by it to run out of line, and, second, it is flexible in the direction of rotation, and adapted to yield slightly, thereby preventing shocks and vibrations from being transmitted from one shaft to the other.

In the accompanying drawing forming a part of this specification I have illustrated the preferred construction of my improved coupling and modifications thereof, and the invention, its advantages and uses will readily be understood from a description of the structures shown.

Referring to the drawing

Figure 1:
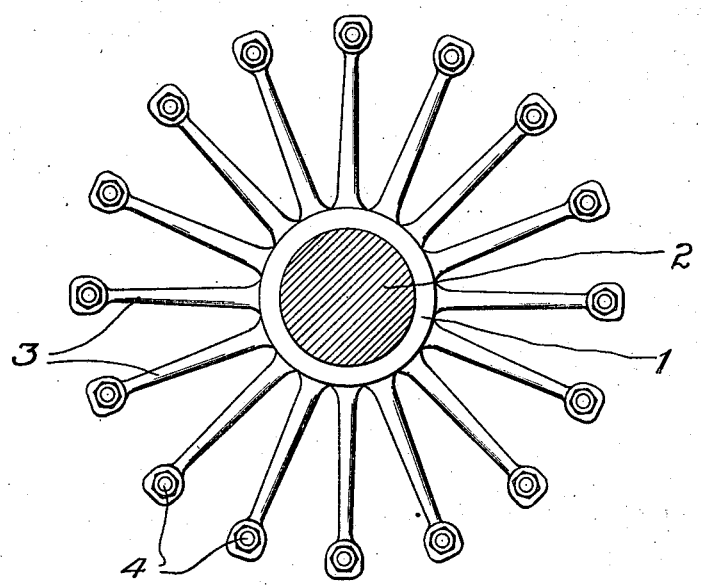
Fig. 1 is an end view of the preferred embodiment of my coupling.
Figure 2:
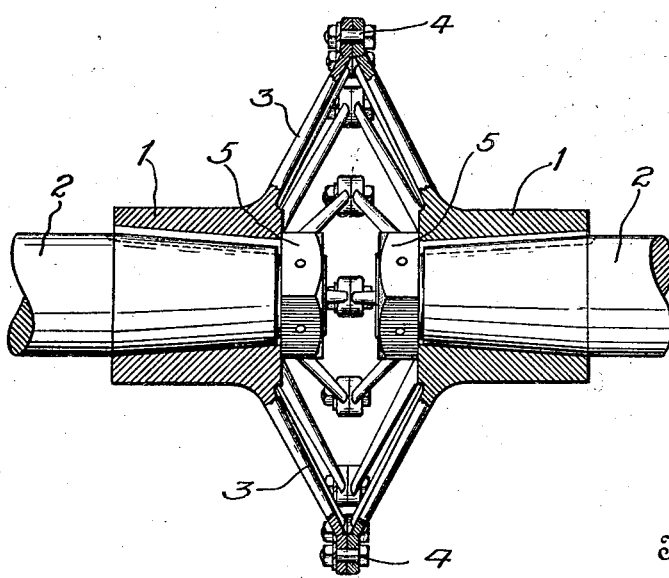
Fig. 2 is a longitudinal section of the structure shown in Fig. 1.
Figure 6:
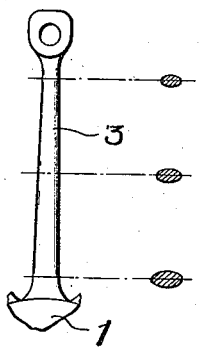
Fig. 6 is a detail view showing the preferred construction of the arms or spokes forming a part of the coupling.

Referring in detail to the structure shown in Figs. 1 and 2, it will be seen that the coupling comprises two oppositely disposed hubs 1 mounted on the shafts 2. Each hub is provided with a large number of radial arms or spokes 3 which extend outwardly and are inclined on each hub so that their outer ends meet and register and are connected together in pairs at their ends by bolts 4. The arms or spokes are formed integral with the hub, preferably of spring steel, and are each preferably tapered outwardly so as to have greater strength at their inner ends adjacent the hub, where the greatest strain is imposed on them. These arms or spokes are relatively small, preferably oval in section, as shown in Fig. 6, and are so proportioned that they will readily yield so as to allow the shafts to run out of line, and also will yield in the direction of rotation so as to materially take up any shocks and vibrations which tend to be transmitted from one shaft to the other.

Figure 3:
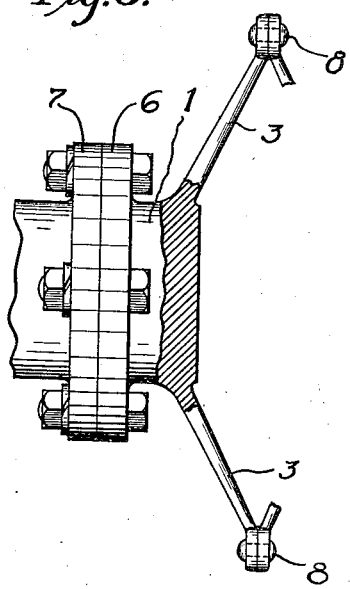
Fig. 3 is a detail view showing a modified arrangement for connecting the coupling to the shaft and for connecting the outer ends of the flexible arms or spokes.
Figure 4:
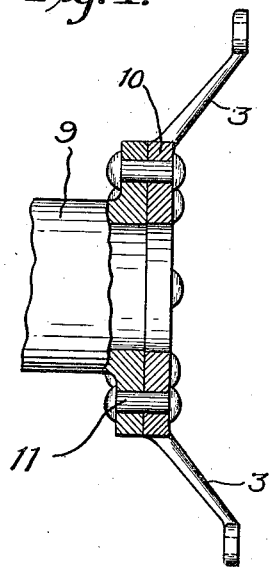
Fig. 4 is a further detail view showing a modified arrangement for forming the hub and spokes.
Figure 5:
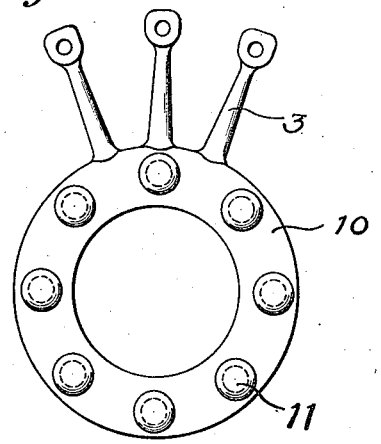
Fig. 5 is an end elevation of the structure shown in Fig. 4.

In the construction shown in Figs. 1 and 2 removable bolts are employed to connect the outer ends of the arms or spokes in order to give access to the nuts 5 employed to hold the hub elements on the shafts. In Fig. 3, however, I have shown a modified arrangement in which the hub 1 is provided with a flange 6 for connecting the coupling to the flange 7 of the shaft, and where this construction is employed, the outer ends of the arms or spokes may be permanently riveted together as shown at 8. In the arrangement so far described in Figs. 1, 2 and 3, the hub is made in one piece integral with the spokes. In the arrangement shown in Fig. 4, however, the hub is made in two parts, the hub proper 9 and the face plate 10. The latter is formed with the spokes thereon, and then secured to the hub by rivets 11, or by equivalent means such as bolts, screws, welding or brazing. When I refer herein to couplings comprising spokes formed integral with the hub, I include couplings such as that shown in Figs. 1, 2 and 3, where the hub is made of one piece and also arrangements such as that shown in Fig. 4, where the hub is formed of two or more parts, the spokes being integral with one of the parts.

In the manufacture of by improved coupling, as shown in Figs. 1 to 3, the metal, which should be of a high quality steel, is first forged so as to form a hub element with a flange thereon. The spokes are then cut or otherwise formed out of the flange and brought to shape, and after such machining or finishing as is necessary, are heat treated and tempered so as to give the arms a high degree of resiliency and toughness. In the manufacture of the arrangement of Fig. 4, the hub element carrying the spokes may be stamped from a sheet and the arms may be formed rectangular in cross section. By constructing the couplings in the ways described, I am enabled to produce a flexible coupling having substantial advantages as compared with those now in use. As an example, I am enabled to produce a coupling for automobile driving shafts which will operate with shafts running as much as ten degrees out of line, which will yield substantially in the direction of rotation, and prevent most of the vibrations of one shaft reaching the other, and which will compare favorably with couplings now in use as to size, weight and durability.

While I have illustrated only the preferred embodiments of my invention and two detail modifications, I am aware that various modifications may be made without departing from the scope of my claims.

What I claim is:

1. A flexible coupling comprising oppositely disposed hub members, arms formed integral with the hub members of spring steel and adapted to yield in the direction of rotation under service use, the arms of the two members being connected at their outer ends.

2. A flexible coupling comprising hub members, arms mounted on each hub member and formed integral with an element thereon of spring steel and adapted to yield in the direction of rotation under service use, the arms of the two members being connected at their outer ends.

3. A flexible coupling comprising oppositely disposed hub members, tapered arms substantially oval in cross section formed integral with the hub members of spring steel and adapted to yield under service uses in the direction of rotation, the arms of the two members being inclined towards each other and connected at their outer ends.

4. A flexible coupling comprising oppositely disposed hub members, tapered arms thereon, the arms on each hub being integral of spring steel and adapted to yield under service uses in the direction of rotation, the arms of the two members being inclined toward each other and connected at their outer ends.

5. A flexible coupling comprising oppositely disposed hub members, tapered arms formed integral with the hub members of spring steel and adapted to yield under service uses in the direction of rotation, the arms of the two members being inclined towards each other and connected at their outer ends.

6. A flexible coupling comprising oppositely disposed hub members, tapered arms substantially oval in cross section formed integral with the hub members of spring steel and adapted to yield under service uses in the direction of rotation, the arms of the two members being inclined towards each other and connected at their outer ends.

CLARENCE W. SPICER.